United States Patent
Maeda et al.

(10) Patent No.: US 7,863,844 B2
(45) Date of Patent: Jan. 4, 2011

(54) ROTATION CONTROL APPARATUS AND METHOD, AND ELECTRONIC DEVICE WHEREIN THE ROTATION CONTROL APPARATUS CAN BE USED

(75) Inventors: Norihiro Maeda, Kyoto (JP); Seiichi Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 505 days.

(21) Appl. No.: 11/597,113

(22) PCT Filed: May 24, 2005

(86) PCT No.: PCT/JP2005/009414

§ 371 (c)(1),
(2), (4) Date: Nov. 20, 2006

(87) PCT Pub. No.: WO2005/114828

PCT Pub. Date: Jan. 12, 2005

(65) Prior Publication Data
US 2008/0067964 A1    Mar. 20, 2008

(30) Foreign Application Priority Data
May 24, 2004   (JP)   .............................. 2004-153567

(51) Int. Cl.
*H02P 7/00* (2006.01)
(52) U.S. Cl. .................... 318/432; 318/434; 388/901
(58) Field of Classification Search ................ 318/432, 318/434, 600, 632, 798; 388/901
See application file for complete search history.

(56) References Cited
U.S. PATENT DOCUMENTS 3,909,688 A * 9/1975 Blaschke et al. ............ 318/700
4,772,839 A * 9/1988 MacMinn et al. ........... 318/696
5,028,852 A * 7/1991 Dunfield ................. 318/400.33

(Continued)

FOREIGN PATENT DOCUMENTS

JP           3-207250          9/1991

(Continued)

OTHER PUBLICATIONS

Chinese Office Action for Chinese Patent Application No. 200580011216.7 issued May 16, 2008 with English Translation.

(Continued)

*Primary Examiner*—Rina I Duda
(74) *Attorney, Agent, or Firm*—Cantor Colburn LLP (57) ABSTRACT

A technology for correctly detecting a rotating position of a rotator at the time of rotation start. A rotation control apparatus controls rotation of a motor, which includes a stator provided with a plurality of coils and a rotor having magnetism. At the time of detecting a position of the motor when the motor is stopped, a control part supplies a current to a plurality of different paths including the coils, a stopped position detecting part measures the current flowing in each of the plurality of paths, judges the order of the measured current values, and a rotating position of the motor is detected based on the order. Based on a combination of a path showing the highest current value and a path showing the second highest current value, the stopped time position detecting part judges a position of the motor.

14 Claims, 8 Drawing Sheets

U.S. PATENT DOCUMENTS

| | | | |
|---|---|---|---|
| 5,117,165 A * | 5/1992 | Cassat et al. | 318/400.11 |
| 5,254,914 A * | 10/1993 | Dunfield et al. | 318/400.34 |
| 5,325,026 A * | 6/1994 | Lyons et al. | 318/400.04 |
| 5,525,886 A * | 6/1996 | Lyons et al. | 318/701 |
| 5,569,990 A * | 10/1996 | Dunfield | 318/400.33 |
| 5,864,217 A * | 1/1999 | Lyons et al. | 318/652 |
| 6,885,163 B2 * | 4/2005 | Heidrich | 318/400.11 |

FOREIGN PATENT DOCUMENTS

| | | |
|---|---|---|
| JP | 6-113585 | 4/1994 |
| JP | 8-19288 | 1/1996 |
| JP | 9-238495 | 9/1997 |
| JP | 11-122977 | 4/1999 |

OTHER PUBLICATIONS

First Office Action, for corresponding Chinese Patent Application No. 200580011216.7, issued Nov. 2, 2007 and English translation.

* cited by examiner

ROTATION CONTROL APPARATUS AND METHOD, AND ELECTRONIC DEVICE WHEREIN THE ROTATION CONTROL APPARATUS CAN BE USED

This is a U.S. national stage application of International Application No. PCT/JP2005/009414, filed on 24 May 2005. Priority under 35 U.S.C. §119(a) and 35 U.S.C. §365(b) is claimed from Japanese Application No. JP2004-153567, filed 24 May 2004, the disclosure of which is also incorporated herein by reference.

TECHNICAL FIELD

The present invention relates to a technology for controlling rotation of a rotator, and in particular, to a rotation control apparatus and method for controlling rotation of a motor including a stator having a plurality of coils and a rotor that is magnetic, and to an electronic device in which the rotation control apparatus can be used.

BACKGROUND TECHNOLOGY

A brushless direct current (DC) motor is generally provided with a rotor having a permanent magnet and a stator having a plurality of phase coils in a star connection, the coils are excited by controlling an electrical current supplied to the coils, and the motor is driven by rotating the rotor relative to the stator. In order to detect a rotation position of the rotor, the brushless DC motor is generally provided with a sensor such as a Hall element or an optical encoder, and by switching the current supplied to each phase coil in accordance with the position detected by the sensor, gives an appropriate torque to the rotor.

In order realize smaller motors, a sensorless motor that detects the rotation position of the rotor without using a sensor, such as the Hall element or the like, has been proposed (for example, Patent Document 1). By measuring electrical potential at the midpoint of the wiring of the motor, for example, the sensorless motor detects induced voltage generated in the coils, and obtains position information. Since this sensorless motor obtains the position information from the induced voltage generated while the rotor is rotating, there is a problem in that it is not possible to know the rotation position when stopped. When the motor is started while not correctly knowing the rotation position, there are cases in which the rotor rotates in a direction opposite to a desired direction of rotation. However, for example in cases in which a spindle motor of a hard disk is rotated, or the like, since it is desirable to curtail, to the minimum, rotation in a reverse direction, it is necessary to appropriately comprehend the rotation position of the motor when the motor is started. For a sensorless motor, technology for detecting the position of the motor when the motor is started is disclosed in, for example, Patent Documents 1, 2 and 3.

Patent Document 1: Japanese Patent Application, Laid Open No. H3-207250

Patent Document 2: Japanese Patent Application, Laid Open No. H6-113585

Patent Document 3: Japanese Patent Application, Laid Open No. H11-122977

Generally, in a brushless DC motor, the rotation position is detected at 60 degree intervals, and current control is carried out in accordance with the detected rotation position; however, in methods described in the abovementioned Patent Documents 1, 2, and 3, the rotation angle detected at a starting time, and the rotation angle when control is performed during driving are out of alignment by 30 degrees. As a result, it is necessary to carry out control for driving the motor after correcting the rotation angle detected at starting time.

DISCLOSURE OF THE INVENTION

The present invention was made in light of this background, and has as an object the provision of technology for accurately detecting the rotation position of a rotator at the starting time.

An aspect of the present invention is related to a rotation control apparatus. This rotation control apparatus is provided with a control unit for supplying a current, when a motor, including a stator having a plurality of coils and a rotor that is magnetic, is stopped, to a plurality of different paths including the coils, and with a position detecting unit for measuring the current flowing in each of the plurality of paths, judging the order of values of the measured current, and detecting a rotation position of the motor based on the order.

For example, in cases in which the motor is provided with coils of three phases, U, V, and W, current flowing in six paths, from the U-phase to the V-phase, from the V-phase to the U-phase, from the V-phase to the W-phase, from the W-phase to the V-phase, from the W-phase to the U-phase, and from the U-phase to the W-phase, may be measured and the order thereof judged. The position detecting unit need not completely judge the complete order, but may judge only the order necessary for detecting the rotation position of the motor. For example, it may judge which are the first and second paths. According to this rotation control apparatus, as described below, since the rotation position of the motor when stopped can be detected in an angle range the same as for control during driving, the rotation of the motor can be controlled more accurately.

The rotation control apparatus is additionally provided with a table storing a correspondence of the order with the rotation position of the motor, and the position detecting unit may refer to the table to detect the rotation position of the motor. The position detecting unit may detect the rotation position of the motor based on a combination of a path in which the current value is highest and a path with the second highest current value.

When the rotation position of the motor is detected when the motor is stopped, the control unit may supply current to the paths that is less than the current supplied to the paths when the motor is being driven. When the rotation position of the motor is detected when the motor is stopped, the control unit may supply current to the paths for a period that is shorter than a period during which current is supplied to the paths when the motor is being driven. In this way, when the rotation position of the motor is being detected, it is possible to prevent the motor from rotating.

A sample-hold circuit, for transforming the current flowing in the paths to a voltage value and holding the value, is additionally provided. Before the current flowing in the plurality of paths is measured, a current is supplied to the paths, and the voltage value at that time may be held in the sample-hold circuit. In this way, since it is possible to approach, in advance, the voltage value that is measured as the voltage value in the sample-hold circuit, detection accuracy can be improved.

Another aspect of the present invention is related to a rotation control method. This rotation control method includes a step of supplying a current, when a motor, including a stator having a plurality of coils and a rotor that is magnetic, is stopped, to a plurality of different paths including the coils, a step of measuring the current flowing in each of the plurality of paths, a step of judging the order of the measured current values, and a step of detecting a rotation position of the motor based on the order.

A further aspect of the present invention is related to an electronic device. This electronic device is provided with a motor for rotating a disk, a rotation control unit for controlling rotation of the motor, and a read-write control unit for controlling writing data to, or reading data from, the disk; the motor includes a stator having a plurality of coils and a rotor that is magnetic; and the rotation control unit includes a control unit for supplying current to a plurality of different paths including the coils, when the motor is stopped, and a position detecting unit for measuring the current flowing in each of the plurality of paths, judging the order of the measured current values, and detecting a rotation position of the motor based on the order.

According to the present invention, a technology can be provided for accurately detecting a rotation position of a rotator at the starting time.

EXPLANATION OF REFERENCE SYMBOLS

1 Magnetic disk drive, 2 Disk, 3 Magnetic head, 4 Read-write control circuit, 10 Rotation control apparatus, 20 Control unit, 30 Power circuit, 40 Position detecting unit, 50 Stopped position detecting unit, 52 Register, 54 Comparator, 56 Selector, 58 Table, 90 Motor, U, V, W Coils

BEST MODE FOR CARRYING OUT THE INVENTION

Figure 1:
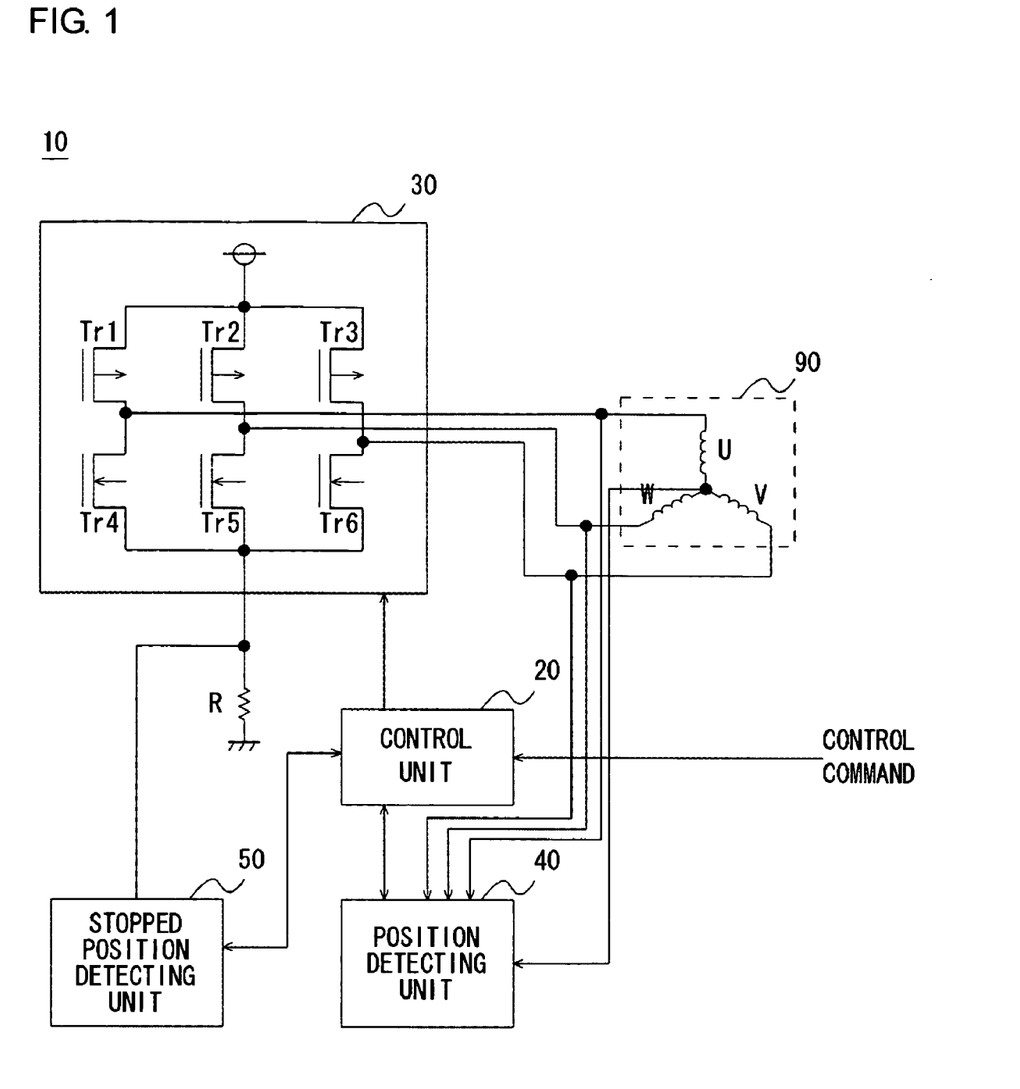
FIG. 1 shows a configuration of a rotation control apparatus related to an embodiment.
Figure 8:
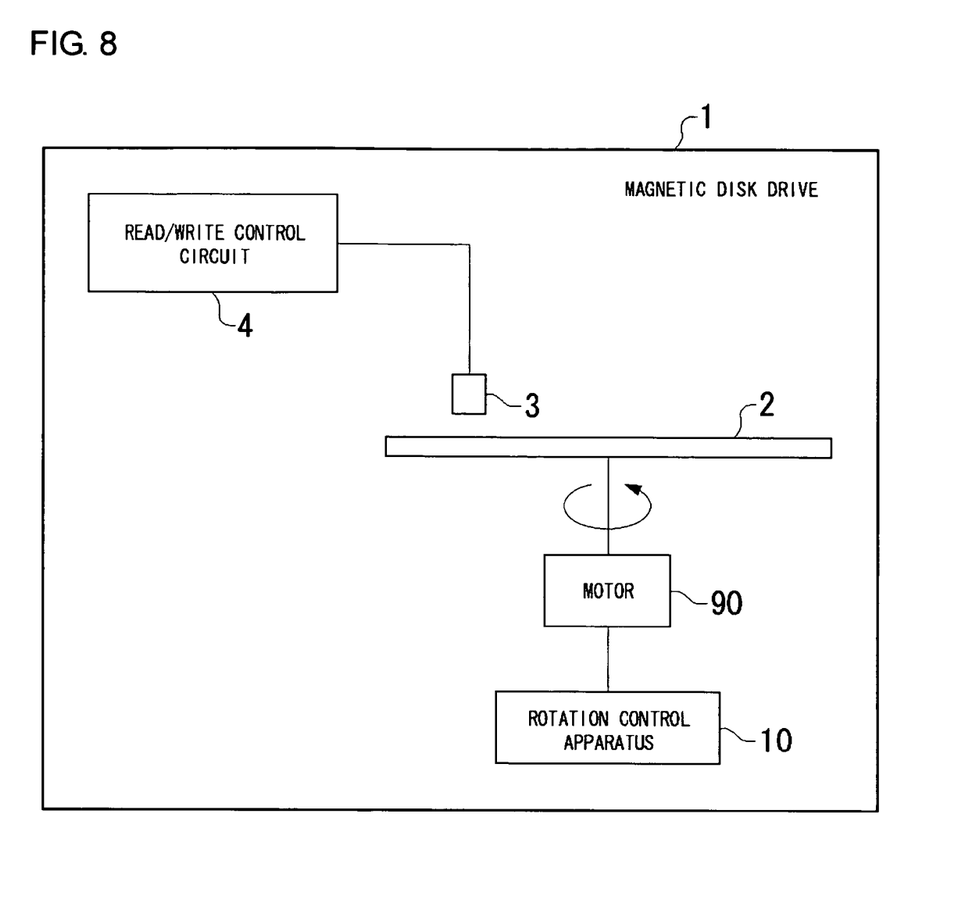
FIG. 8 shows a configuration of a magnetic disk drive related to the embodiment.

FIG. 1 shows a configuration of a rotation control apparatus 10 related to an embodiment. FIG. 8 shows a configuration of a magnetic disk drive 1 that is one example of an electronic device on which the rotation control apparatus 10 shown in FIG. 1 is mounted. The magnetic disk drive 1 drives a magnetic disk such as a DVD, CD, HD, FD, or MD, mounted on a personal computer or the like. The magnetic disk drive 1 is provided with a disk 2, a magnetic head 3, a read-write control circuit 4, a motor 90, and a rotation control apparatus 10. The rotation control apparatus 10 controls driving of the motor 90 for rotating the disk 2, in accordance with a command from a host device such as the personal computer. The read-write control circuit 4 controls writing data to, and reading data from, the disk 2, in accordance with a command from the host device. The read-write control circuit 4 makes the magnetic head 3 move in a radial direction of the disk so as to scan the disk 2, which rotates, and writes data to the disk 2, or reads data from the disk 2. FIG. 8 shows a magnetic disk drive as an example of an electronic device; however, besides this, the present invention can be applied to various electronic devices in which a motor is mounted, such as an optical disk drive or the like.

Returning to FIG. 1, the rotation control apparatus 10 controls rotation of a sensorless brushless DC motor 90 (referred to below simply as the motor 90). The rotation control apparatus 10 is provided with a control unit 20, a power circuit 30, a position detecting unit 40, and a stopped position detecting unit 50. Since known technology can be used for a driving method for the motor 90, in the present embodiment a simple explanation is given concerning a normal driving method for the motor 90, with the explanation focusing on technology for detecting the rotation position when the motor 90 is started.

The control unit 20 controls current supplied to three phase coils U, V, and W, of which the stator of the motor 90 is configured. The power circuit 30 is provided with six transistors Tr1 to Tr6 for switching, and by switching the transistors Tr1 to Tr6 ON or OFF, current supplied to the coils U, V, and W is switched ON or OFF. The control unit 20 controls the ON and OFF state of transistors Tr1 to Tr6. The position detecting unit 40 obtains the electrical potential at the midpoint of the wiring of the motor 90, when the motor 90 is driven, detects induced voltage generated in the coils, and obtains position information of the motor 90. The control unit 20 obtains control commands such as those concerning rotation direction and rotation speed of the motor 90, and determines current supplied to the coils of the motor 90 according to the rotation position of the motor 90, detected by the position detecting unit 40.

The stopped position detecting unit 50 detects the position of the motor 90 before the motor 90 starts. When the motor 90 is stopped, and when a test current is supplied to the plurality of different paths including the coils of the motor 90, the stopped position detecting unit 50 measures the current flowing in each of the plurality of paths, determines the order of the measured current values, and detects the rotation position of the motor based on the determined order. The current flowing in the paths including the coils is converted by a sensing resistor R into voltage and is measured. Supply of the test current, similar to when the motor 90 is being driven, is performed by the control unit 20 and the power circuit 30. In order to prevent the motor 90 from rotating due to the test current, the current value of the test current is preferably lower than the value of the current supplied during driving, and the period during which the test current is supplied is preferably shorter than during driving.

Figure 2:
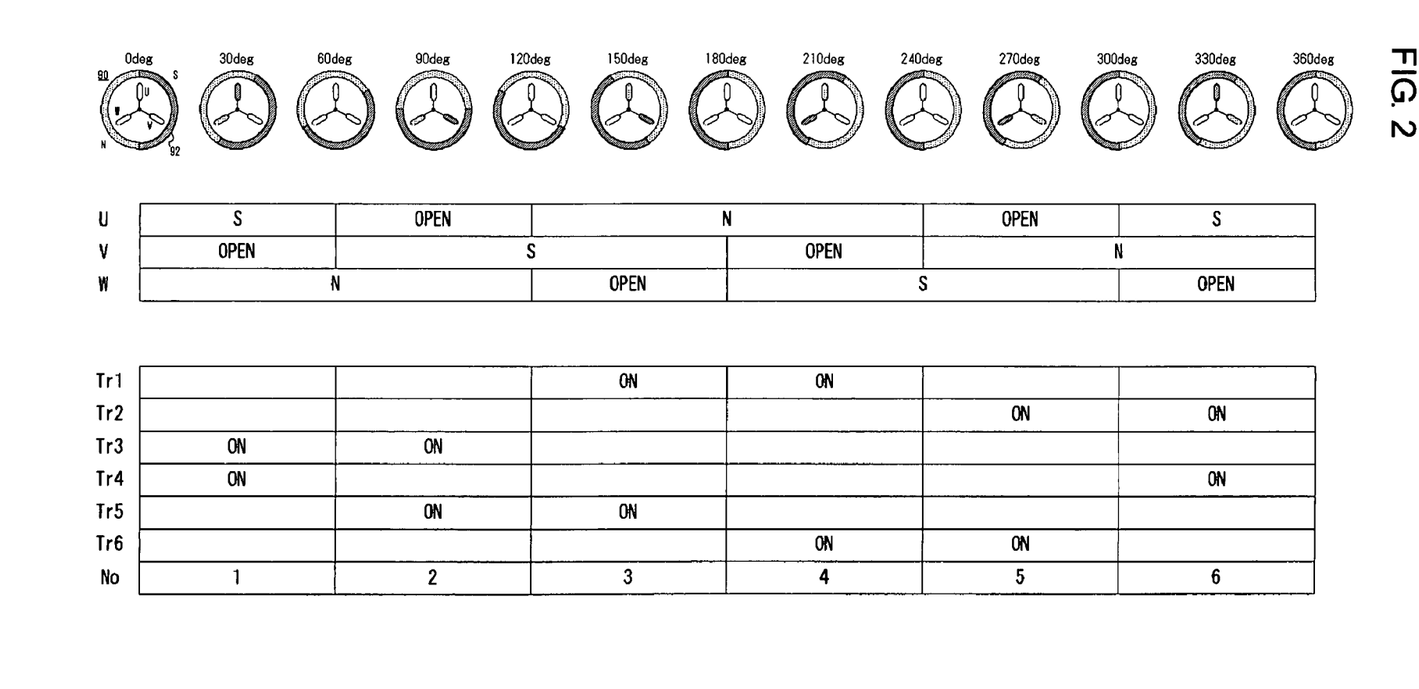
FIG. 2 is a sequence diagram showing an aspect of rotation of a motor.

FIG. 2 is a sequence diagram showing an aspect of the rotation of the motor 90. The upper level of FIG. 2 shows rotation positions of the motor 90; the mid-level of FIG. 2 shows the polarity of the coils U, V, and W that are excited when the control unit 20 supplies the current to the coils U, V, and W in order to drive the motor 90; and the lower level of FIG. 2 shows the state of the transistors Tr1 to Tr6 of the power circuit 30 controlled by the controller 20, and sequence numbers. Switching of the driving current is carried out at 60 degree intervals with a certain angle (for example, 0 degrees) as a reference, and the transistors are switched ON and OFF sequentially, in ascending order of sequence numbers when the motor 90 is rotated in a clockwise direction, and in descending order of sequence numbers when rotated in an anticlockwise direction. For example, when the motor 90 is rotated from a position of an electrical angle of 0, in a clockwise direction, the control unit 20 firstly switches the transistors Tr3 and Tr4 ON. In this way, since the coil U is excited with S polarity and the coil W with N polarity, the rotor 92 rotates in a clockwise direction. When the rotation angle of the motor 90 reaches 60 degrees, the control unit 20 respectively switches the transistor Tr4 OFF and the transistor Tr5 ON. In this way, since the coil V is excited with S polarity and the coil W with N polarity, the rotor 92 rotates further in a clockwise direction.

Figure 3:
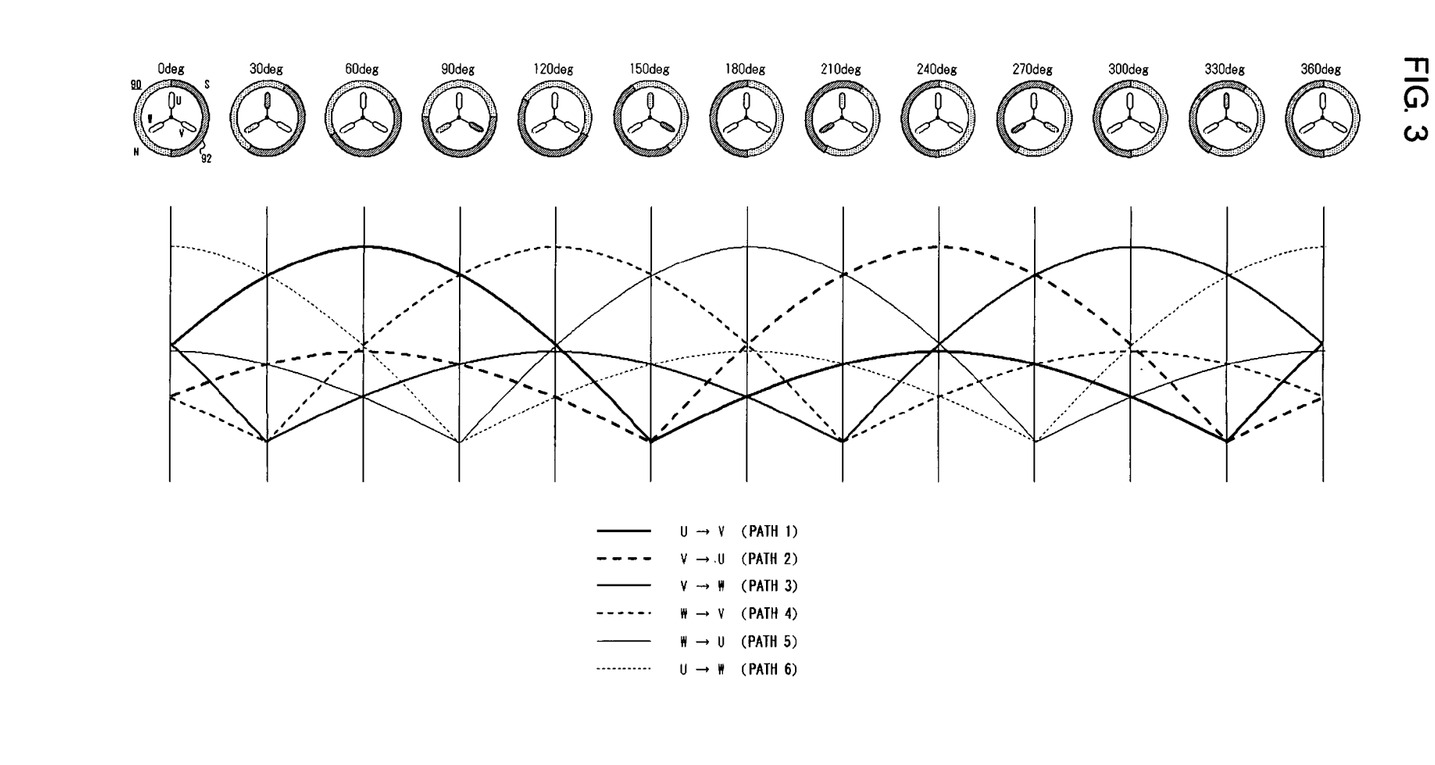
FIG. 3 shows a relationship between a rotation angle of the motor when stopped, and a current value when the current flows in a plurality of paths including coils.

FIG. 3 shows a relationship between the rotation angle of the motor 90 when stopped, and an electrical current value when the current flows in the plurality of paths including the coils. Since each of the coils is placed in the magnetic field of the rotor 92, which is a permanent magnet, due to the effect of the magnetic field, the apparent inductance of each coil is different. As a result, the value of the current flowing in the coils exhibits a rotation angle dependency, as in FIG. 3. FIG. 3 shows current values for six paths described below.

Thick solid line: U-phase →V-phase (Path 1: similar to Sequence No. 4 in FIG. 2)

Thick broken line: V-phase→U-phase (Path 2: similar to Sequence No. 1 in FIG. 2)

Medium solid line: V-phase→W-phase (Path 3: similar to Sequence No. 2 in FIG. 2)

Medium broken line: W-phase→V-phase (Path 4: similar to Sequence No. 5 in FIG. 2)

Thin solid line: W-phase→U-phase (Path 5: similar to Sequence No. 6 in FIG. 2)

Thin broken line: U-phase→W-phase (Path 6: similar to Sequence No. 3 in FIG. 2)

In this way, by measuring the value of the current in the six paths, the positional relationship of the rotor 92 and the coils can be known. In the present embodiment, the value of the current in the six paths described above is measured, the measured current values are compared, and from a combination of the path in which the highest measured current value is measured and a path in which the second highest current value is measured, the rotation position of the motor 90 is detected. For example, in cases in which the top two are the path 1 and the path 4, as may be understood from FIG. 3, the rotation angle of the motor 90 is between 0 degrees and 60 degrees.

By detecting the position of the motor 90 from a combination of the top two values, the position of the motor 90 can be detected in an angular range similar to a sequence of current control when the motor 90 is being driven, as shown in FIG. 2. According to a method described in Patent Documents 1 to 3, the position is detected at an angular range 30 degrees out of alignment from the angular rage when the current control is performed when the motor 90 is being driven, as, for example, from 30 degrees to 90 degrees, and from 90 degrees to 150 degrees. As a result, after detecting the position of the motor 90 when starting, it was necessary to perform current control after offsetting the detected angle by 30 degrees. However, according to the method of the present embodiment, since the position information can be obtained at an angular range similar to when the motor is being driven, the obtained position information can be used as it is, the motor 90 can be driven more accurately, and, for example, when starting, rotation in an reverse direction can be curtailed to a minimum.

Figure 4:
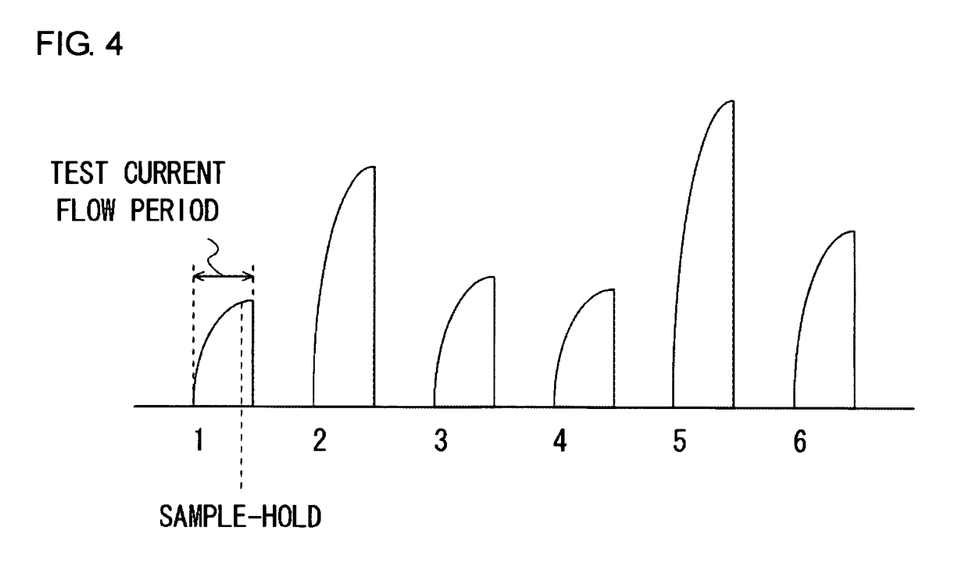
FIG. 4 shows an example of a voltage value detected by a sensing resistor when a test current is flowing.

FIG. 4 shows an example of a voltage value detected by the sensing resistor R when the test current is flowing. When a supply of the test current is started, a current flows in the paths including the coils, and a potential difference between both terminals of the sensing resistor R gradually increases. When the current is supplied to each of the six paths, the stopped position detecting unit 50 does a sample-hold of the voltage values after a fixed time has elapsed from when current flows, and compares these voltage values. In the example of FIG. 4, since the top two paths are the path 2 and the path 5, by referring to FIG. 2 it is understood that the position of the motor 90 is between 240 degrees and 300 degrees.

Figure 5:
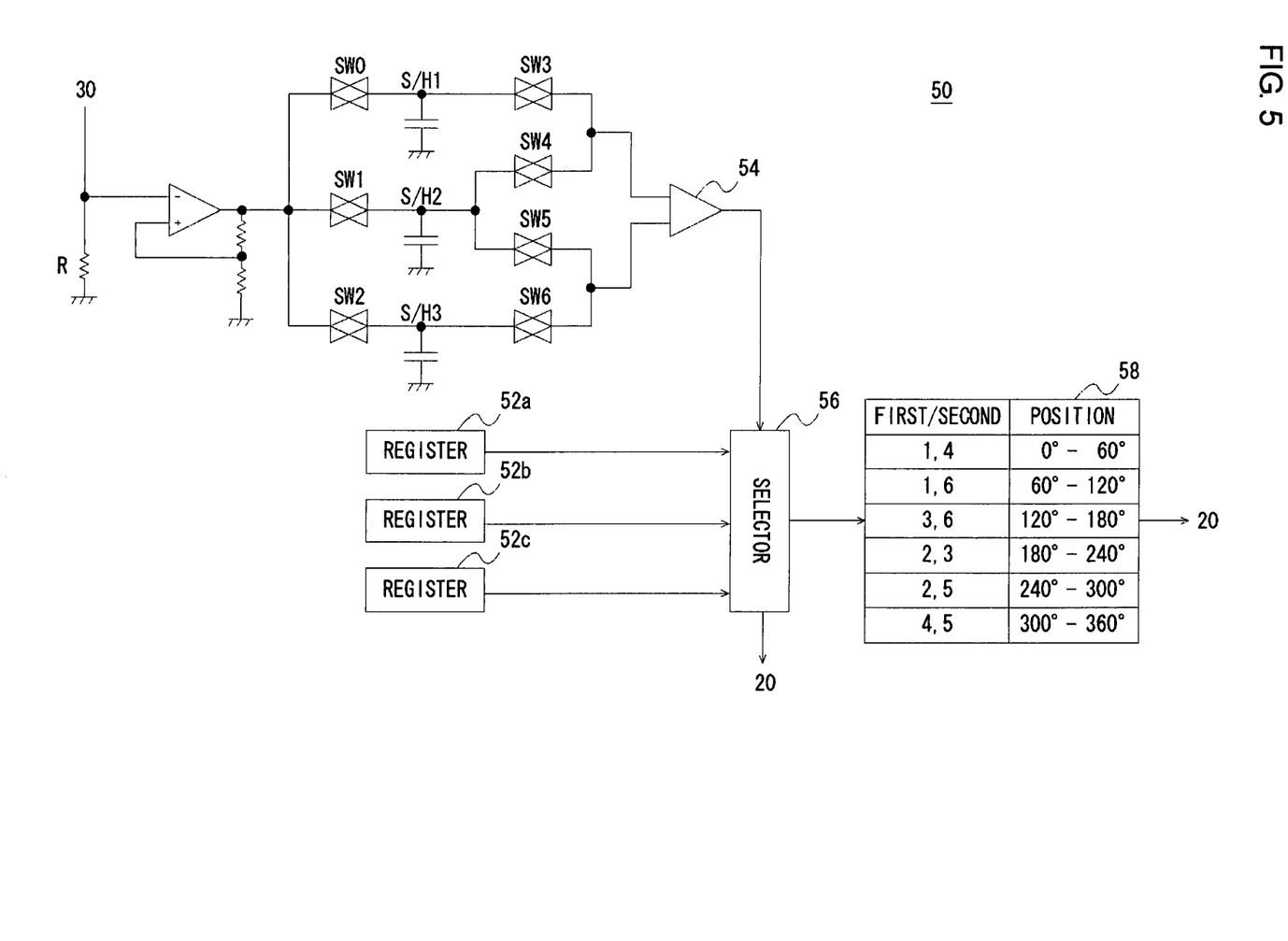
FIG. 5 shows a schematic configuration of a stopped position detecting unit.

FIG. 5 shows a schematic configuration of the stopped position detecting unit 50. When the motor 90 is stopped, if a current is supplied by the control unit 20 to the paths including the coils, the currents flowing in the coils are converted into voltage values by the sensing resistor R, and are amplified by an amplifier. Switches SW0 to SW2 switch so as to input the voltage values, converted by the sensing resistor R, into one of sample-holds S/H1 to S/H3. Switches SW3 to SW6 switch so as to input any among the voltage values held by the sample-holds S/H1 to S/H3, into a comparator 54. The comparator 54 compares the voltage values held in the sample-holds S/H1 to S/H3 and outputs to a selector 56. Registers 52*a* to 52*c* store data showing that the voltage values held in the sample-holds S/H1 to S/H3 are measured results of any of the paths. In the present embodiment, since measurement of the voltage values in six paths is carried out, the registers 52*a* to 52*c* may each store three bit data. When measurement of the six paths is complete, the selector 56 outputs which are the top two paths. The stopping position detecting unit 50 holds a table 58 storing a correspondence between a combination of the top two paths and the rotation position of the motor 90, refers to the table 58, detects the rotation position of the motor 90, and outputs to the control unit 20.

Figure 6:
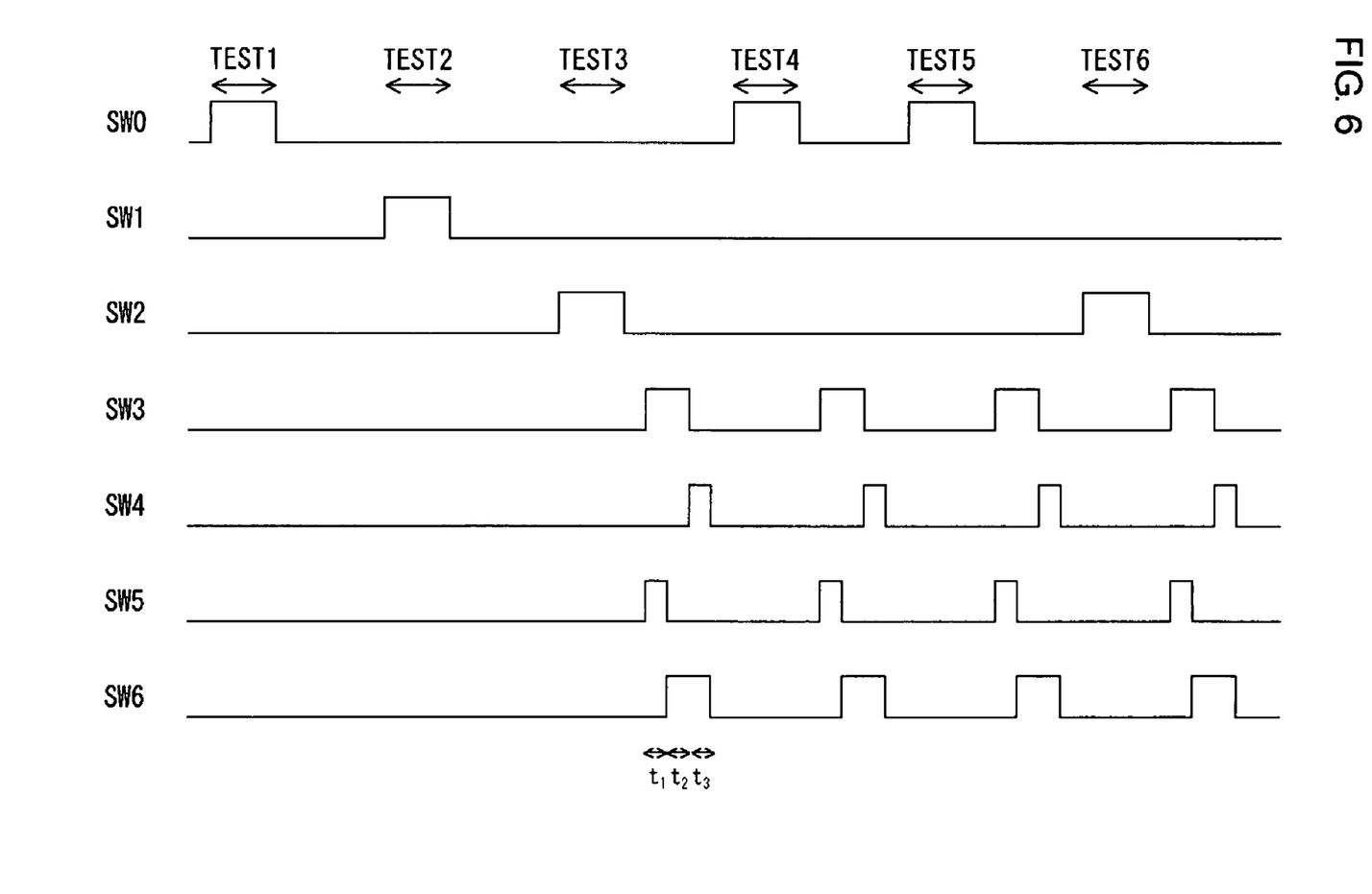
FIG. 6 is a timing chart explaining operation of the stopped position detecting unit.

FIG. 6 is a timing chart explaining operation of the stopped position detecting unit 50. The control unit 20 may control operation of the various configurations of the stopped position detecting unit 50; a configuration for control may be arranged inside the stopped position detecting unit 50, but here the control unit 20 performs the control. While supplying current to the path 1, the control unit 20 switches the switch SWO to ON, and inputs the voltage value converted by the sensing resistor R to the sample-hold S/H1. In addition, in order to record the fact that a measured result of the path 1 is held in the sample-hold S/H1, the control unit 20 stores "1" in the register 52*a*. Next, while supplying current to the path 2, the control unit 20 switches the switch SW1 to ON, and inputs the measured voltage value to the sample-hold S/H2. At this time, "2" is stored in the register 52*b*. Furthermore, while supplying current to the path 3, the control unit 20 switches the switch SW2 to ON, and inputs the measured voltage value to the sample-hold S/H3. At this time, "3" is stored in the register 52*c*.

When the measured results are input to the three sample-holds S/H1 to S/H3, the stopped position detecting unit 50 compares the voltage values thereof and judges the order. First, in a time period t1, if the control unit 20 switches the switches SW3 and SW5 to ON, the voltage values held in the sample-holds S/H1 and S/H2 are input to the comparator 54. That is, the measured result of the path 1 and the measured result of the path 2 are compared. A comparison result is output to the selector 56. Next, in a time period t2, if the control unit 20 switches the switches SW3 and SW6 to ON, the voltage values held in the sample-holds S/H1 and S/H3 are input to the comparator 54, and the measured result of the path 1 and the measured result of the path 3 are compared. A comparison result is output to the selector 56. Finally, in a time period t3, if the control unit 20 switches the switches SW4 and SW6 to ON, the voltage values held in the sample-holds S/H2 and S/H3 are input to the comparator 54, and the measured result of the path 2 and the measured result of the path 3 are compared. The comparison result is output to the selector 56. This results are output serially from the comparator 54 to the selector 56, as three comparison results in three bit signals. The selector 56 judges, from the three comparison results, the path in which the voltage value is lowest among the three paths, and communicates this to the control unit 20. Here, the measured result of the path 1 is the lowest.

The control unit 20 switches the measured result of the path 4, subsequently implemented, and the measured result of the lowest path communicated from the selector 56. That is, the measured result of the path 4 is input to the sample-hold (in this case, S/H1) in which the lowest measured result, communicated from the selector 56, is held; the control unit 20, while supplying current to the path 4, switches the switch SW0 to ON, and inputs the measured voltage value to the sample-hold S/H1. At this time, the control unit 20 stores "4" in the register 52a. In this way, the measured result of the path 4 is held in the sample-hold S/H1, the measured result of the path 2 is held in the sample-hold circuit S/H2, and the measured result of the path 3 is held in the sample-hold S/H3. Next, similarly to the procedure described above, the voltage values held in the sample-holds S/H1 to S/H3 are compared and the comparison result is output to the selector 56. The selector 56 communicates the lowest path to the control unit 20.

A procedure similar to that described above is repeated for the path 5 and the path 6, and finally after completing measurement of the path 6, the top two paths among the six paths are judged by the selector 56. The control unit 20 refers to the table 58, and, from the combination of the top two paths, detects the position of the motor 90. In this way, even in the motor 90 in which a sensor for detecting the position is not provided, the position of the motor 90 can be accurately detected when the motor 90 is stopped.

Figure 7:
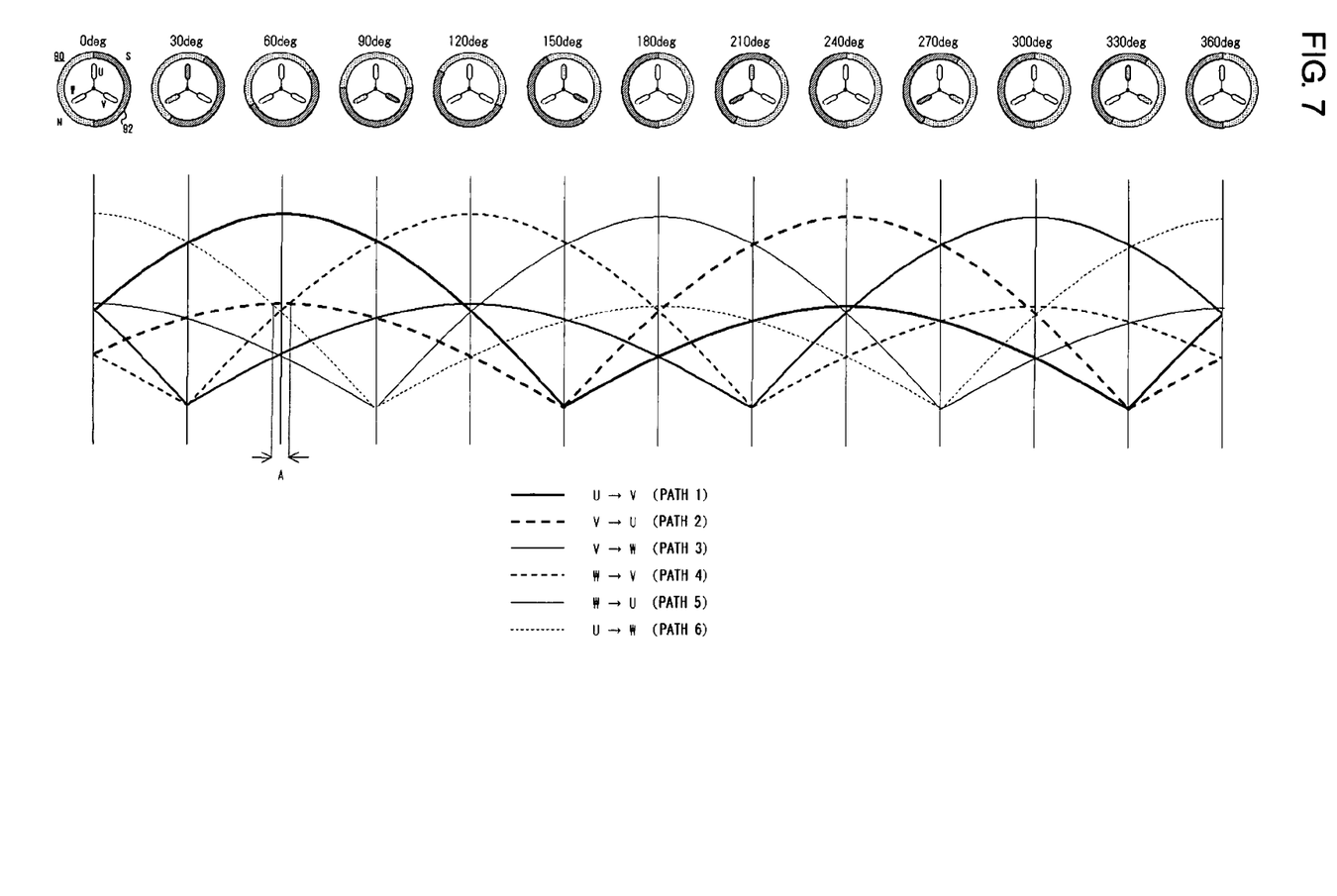
FIG. 7 shows another example of the relationship between the rotation angle of the motor when stopped, and the electrical current value when the current flows in the plurality of paths including the coils.

FIG. 7 shows another example of a relationship between the rotation angle of the motor 90 when stopped, and the current value when the current flows in the plurality of paths including the coils. In the example of FIG. 7, in a range A close to an angle of 60 degrees, for example, the current value of the path 2 is higher than the current values of the path 4 and the path 6, and the order is different from the example shown in FIG. 3. In this case, for example, when the judged result that the combination of the path in which the current value is highest and the path in which it is second highest are the path 1 and the path 2, the stopped position detecting unit 50 may judge that the position of the motor 90 is in a range of 0 degrees to 60 degrees, or may judge that it is in a range of 60 degrees to 120 degrees. That is, range A may be assumed to be included in the range of 0 degrees to 60 degrees, or may be assumed to be included in the range of 60 degrees to 120 degrees. The range in which the order is switched is relatively wide, and when the abovementioned type of judgment is performed and the error becomes large, the stopped position detecting unit 50, for example, may consider not only the combination of the first and second, but also the third and lower ordered paths, to judge the angle of the motor 90.

The present invention has been explained above based on the embodiment. This embodiment is an example; various modified examples of combinations of various component elements and various processes thereof are possible, and a person skilled in the art may understand that such modified examples are within the scope of the present invention.

In the embodiment, three sample-holds are used and a comparison of the current flowing in six paths is carried out; however, four or more sample-holds may also be used. In addition, the configuration for judging the order of the current values is not limited to the configuration shown in FIG. 5; optional configurations are also possible, and, for example, the order may be judged by software processing by a multi-purpose circuit such as a CPU.

In the embodiment, the position of the motor 90 is detected at 60 degree intervals; however, the position can also be detected, for example, not with a combination of the first and second paths, but in addition to considering these orders, at intervals of 30 degrees.

Before measuring the current values when current is supplied to the abovementioned six paths, in preparation for measurement, the current is supplied to any of the paths, and the voltage value at that time may be held in the sample-holds S/H1 to S/H3. For example, current is supplied twice to the path 1, and the voltage values of the sample-holds S/H1 to S/H3 are made to approach, in advance, values at measurement time. In this way, the accuracy of detection of the voltage values in the sample-holds S/H1 to S/H3 can be improved.

INDUSTRIAL USABILITY

The present invention can be used in a rotation control apparatus for controlling rotation of a motor.

What is claimed is:

1. A rotation control apparatus structured to control a motor comprising a stator having a plurality of coils and a rotor having a permanent magnet, the motor being driven by current supplied to the coils, the rotation control apparatus comprising:
    a control unit structured to supply a current to more than two different paths including the plurality of coils when the motor is stopped; and
    an initial position detecting unit structured to measure a current value flowing in each of the different paths with the motor stopped by the control unit, after a predetermined time has elapsed from when current is supplied by said control unit, to detect the initial rotation position of the motor based on a combination of the highest and second highest current values of the measured current values through all of the different paths.

2. A rotation control apparatus according to claim 1, further comprising:
    a table for storing a correspondence between the relationship of the measured current values and the initial rotation position of the motor, wherein
    the initial position detecting unit refers to the table and detects the initial rotation position of the motor.

3. A rotation control apparatus according to claim 1, wherein,
    the control unit supplies a current to the paths that is less than a current supplied to the coils when the motor is being driven.

4. A rotation control apparatus according to claim 2, wherein,
    the control unit supplies a current to the paths that is less than a current supplied to the coils when the motor is being driven.

5. A rotation control apparatus according to claim 1 wherein,
    the control unit supplies the current to the paths for a period that is shorter than a period during which the current is supplied to the coils when the motor is being driven.

6. A rotation control apparatus according to claim 2 wherein, the control unit supplies the current to the paths for a period that is shorter than a period during which the current is supplied to the coils when the motor is being driven.

7. A rotation control apparatus according to claim 1, further comprising:
a sample-and-hold circuit for converting the current value flowing in the paths to a voltage value and holding the value, wherein,
the voltage value held in the sample-and-hold circuit is measured as an indication of the measured current value.

8. A rotation control apparatus according to claim 2, further comprising:
a sample-and-hold circuit for converting the current value flowing in the paths to a voltage value and holding the value, wherein,
the voltage held in the sample-and-hold circuit is measured as an indication of the measured current value.

9. A rotation control apparatus according to claim 3, further comprising:
a sample-and-hold circuit for converting the current value flowing in the paths to a voltage value and holding the value, wherein,
the voltage value held in the sample-and-hold circuit is measured as an indication of the measured current value.

10. A rotation control apparatus according to claim 5, further comprising:
a sample-and-hold circuit for converting the current value flowing in the paths to a voltage value and holding the value, wherein,
the voltage value held in the sample-and-hold circuit is measured as an indication of the measured current value.

11. A rotation control apparatus according to claim 1, wherein
the initial position detecting unit detects the initial rotation position of the motor, based on a pair of values of the measured current values flowing in a pair of the plurality of paths, respectively.

12. A rotation control apparatus according to claim 1, wherein
the initial position detecting unit detects the initial rotation position of the motor based on the order of amplitude of the measured current values.

13. A rotation control apparatus according to claim 1, wherein
the initial position detecting unit measures the current value which varies depending on the rotation position of each of the coils relative to the rotor having the permanent magnet.

14. A rotation control method for a motor including a stator having a plurality of coils and a rotor having a permanent magnet, the motor being driven by current supplied to the coils, the rotation control method comprising:
supplying a current to more than two different paths including the plurality of coils when the motor is stopped;
measuring the current value flowing in each of the different paths after a predetermined time has elapsed from when current is supplied; and
detecting an initial rotation position of the motor based on a combination of the highest and second highest current values of the measured current values through all the different paths.

* * * * *